(12) United States Patent
Smith

(10) Patent No.: US 9,688,383 B2
(45) Date of Patent: Jun. 27, 2017

(54) METHOD AND SYSTEM FOR INSULATING FRAME MEMBER

(71) Applicant: The Boeing Company, Chicago, IL (US)

(72) Inventor: Randall S. Smith, Seattle, WA (US)

(73) Assignee: The Boeing Company, Chicago, IL (US)

( * ) Notice: Subject to any disclaimer, the term of this patent is extended or adjusted under 35 U.S.C. 154(b) by 145 days.

(21) Appl. No.: 14/552,475

(22) Filed: Nov. 24, 2014

(65) Prior Publication Data

US 2016/0176498 A1    Jun. 23, 2016

Related U.S. Application Data

(62) Division of application No. 13/048,849, filed on Mar. 15, 2011, now Pat. No. 8,899,519.

(51) Int. Cl.
*B64C 1/40* (2006.01)
*B61D 17/18* (2006.01)
(Continued)

(52) U.S. Cl.
CPC ............... *B64C 1/40* (2013.01); *B61D 17/18* (2013.01); *B61D 17/185* (2013.01); *B64C 1/06* (2013.01);
(Continued)

(58) Field of Classification Search
CPC .... B64C 1/40; B64C 1/06; B64C 1/12; B64C 1/403; F16L 59/029; F16L 59/12;
(Continued)

(56) References Cited

U.S. PATENT DOCUMENTS 2,324,654 A * 7/1943 Tinnerman et al. ............ 52/479
3,090,646 A * 5/1963 Johnson .................... 296/107.11
(Continued)

FOREIGN PATENT DOCUMENTS

DE    2035807         1/1972
DE    3513662 A1    10/1986
(Continued)

OTHER PUBLICATIONS

USPTO Non-Final Office Action, mailed Dec. 17, 2013, for parent case, U.S. Appl. No. 13/048,849, filed Mar. 15, 2011, now issued as U.S. Pat. No. 8,899,519 B2, 8 pages.
(Continued)

*Primary Examiner* — Valentina Xavier

(57) ABSTRACT

An insulation system, for use with transport vehicle structural frame members, having at least a first structural frame member and adjacent structural frame members in a transport vehicle. Each structural frame member has a first free end, a second end attached to a transport vehicle wall, and two sides disposed between the first and second ends. The system has at least one flexible insulation member wrapped over the first free end and over at least portions of the two sides, and at least first and second self-retaining foam insulation members positioned on each side of the wrapped first structural frame member and disposed in compression fit between each side of the wrapped first structural frame member and each of the adjacent structural frame members. The foam insulation members impart one or more compression forces on the flexible insulation member to secure it in place without use of any fastener device.

13 Claims, 10 Drawing Sheets

(51) Int. Cl.
   *B64C 1/06* (2006.01)
   *B64C 1/12* (2006.01)
   *E04F 13/08* (2006.01)
   *F16L 59/02* (2006.01)
   *F16L 59/12* (2006.01)
   *B64F 5/10* (2017.01)

(52) U.S. Cl.
   CPC ............... *B64C 1/12* (2013.01); *B64C 1/403* (2013.01); *B64F 5/10* (2017.01); *E04F 13/0812* (2013.01); *F16L 59/029* (2013.01); *F16L 59/12* (2013.01); *Y02T 50/46* (2013.01); *Y10T 29/4987* (2015.01)

(58) Field of Classification Search
   CPC .. B64F 5/0009; E04F 13/0812; B61D 17/185; B61D 17/18; Y10T 29/4987; Y02T 50/46
   USPC ..... 244/119, 158.1; 52/309.9, 396.01, 404.1, 52/471, 479
   See application file for complete search history.

(56) References Cited

U.S. PATENT DOCUMENTS

| | | | |
|---|---|---|---|
| 3,231,944 A | | 2/1966 | Bennett |
| 3,363,383 A | * | 1/1968 | La Barge ................. 52/471 |
| 3,775,921 A | * | 12/1973 | Avera ..................... 52/471 |
| 4,234,035 A | * | 11/1980 | Babbs ..................... 160/392 |
| 4,235,398 A | | 11/1980 | Johnson |
| 4,308,309 A | | 12/1981 | Leiser et al. |
| 4,344,591 A | | 8/1982 | Jackson |
| 4,441,726 A | * | 4/1984 | Uhl ....................... 277/652 |
| 5,048,248 A | * | 9/1991 | Ting ....................... 52/309.9 |
| 5,511,844 A | * | 4/1996 | Boardman .............. 296/107.11 |
| 5,545,273 A | | 8/1996 | Rasky et al. |
| 5,829,820 A | * | 11/1998 | Cowsert ................. 296/107.11 |
| 6,341,810 B2 | * | 1/2002 | Hartmann et al. ....... 296/107.01 |
| 7,040,575 B2 | | 5/2006 | Struve et al. |
| 8,899,519 B2 | | 12/2014 | Smith |
| 2006/0118676 A1 | | 6/2006 | Novak et al. |
| 2006/0145006 A1 | | 7/2006 | Drost |
| 2006/0194893 A1 | | 8/2006 | Prybutok |
| 2009/0032640 A1 | | 2/2009 | Moores et al. |
| 2010/0199583 A1 | | 8/2010 | Behrens et al. |

FOREIGN PATENT DOCUMENTS

| | | |
|---|---|---|
| DE | 19848677 A1 | 7/1999 |
| DE | 19848679 A1 | 7/1999 |
| DE | 19856377 A1 | 6/2000 |
| DE | 10001778 A1 | 8/2000 |
| EP | 0692424 A2 | 1/1996 |
| EP | 0758603 A2 | 2/1997 |
| EP | 2311722 A1 | 4/2011 |
| GB | 1518802 A | 7/1978 |
| WO | 2005095206 A1 | 10/2005 |
| WO | 2007131583 A1 | 11/2007 |

OTHER PUBLICATIONS

International Search Report and Written Opinion of the International Searching Authority, mailed Jul. 4, 2012, for counterpart international application PCT/US2012/023511,11 pages.

G.P. Mathur, et al., "Aircraft Cabin Noise Control with Smart Foam Treatment on Fuselage Sidewall-Laboratory Tests", American Institute of Aeronautics & Astronautics, AIAA-2001-2231, A01-30870, 2001, pp. 1-8.

National Aeronautics and Space Administration, NASA Facts, "Orbiter Thermal Protection System", Mar. 1997, FS-2000-06-29-KSC, 4 pages.

Ed Memi, "Analyze This: Boeing Provides Data, Work to NASA for Safe Space Shuttle Re-Entry", Boeing Frontiers, Oct. 2005, vol. 04, Issue 6, 3 pages.

Ed Memi, "Boeing Engineers Assist NASA in Shuttle Tile Work", Jan. 25, 2006, 1 pages, available at <www.boeing.com/news/releases/2006/q1/060125a_nr.html>, last visited Mar. 14, 2011.

Thermostatic Industries, Inc., "Tadpole Gaskets", 2 pages, available at <http//www.thermostatic.com/gaskets/doorseals.shtml>, last visited Mar. 14, 2011.

Wikipedia, Definition of "Bulk modulus", 5 pages, available at <http://en.wikipedia.org/wiki/Bulk_modulus>, last visited Mar. 14, 2011.

* cited by examiner

METHOD AND SYSTEM FOR INSULATING FRAME MEMBER

CROSS-REFERENCE TO RELATED APPLICATIONS

The present application is a divisional of and claims priority to pending application Ser. No. 13/048,849, filed Mar. 15, 2011, entitled METHOD AND SYSTEM FOR INSULATING FRAME MEMBER, the entire contents of which is incorporated herein by reference.

BACKGROUND

1) Field of the Disclosure

The disclosure relates generally to methods and systems for insulating structures in vehicles and architectural structures, and more particularly, to methods and systems for insulating structural frame members in vehicles.

2) Description of Related Art

Insulation is typically provided on the interior of structures of transport vehicles, such as aircraft, aerospace vehicles, trains, watercraft and other transport vehicles. Such insulation can provide a thermal barrier to regulate temperature for the comfort of the vehicle occupants, can provide an acoustic barrier to reduce engine noise and/or noise from outside air turbulence, and can provide a protective barrier against moisture and temperature extremes that may damage or corrode mechanical and structural components within the transport vehicles.

Known systems and methods for installing insulation in transport vehicles, for example, aircraft and aerospace vehicles, include manual systems and methods. Such known manual systems and methods typically involve using a variety of fastener devices to secure the insulation to the structural components of the wall or body of the transport vehicle. Such fastener devices can include steel or aluminum spring clips or clamps, plastic or metal pins with a retaining device, and hook and loop fastening tape.

FIG. 2 is an illustration of a partial front perspective view of a prior art aircraft fuselage interior 26. The aircraft fuselage interior 26 typically includes a fuselage wall or skin 28, aircraft frame members 30 coupled to the fuselage wall or skin 28, and aircraft windows 32. FIG. 3 is an illustration of a partial front perspective view of the prior art aircraft fuselage interior 26 of FIG. 2 showing prior art insulation blankets 34 secured to the aircraft frame members 30 with prior art fastener devices 36, typically in the form of clip fasteners 38 (see FIGS. 4A, 4B). FIG. 4A is an illustration of a cross-sectional top view of a portion of a prior art aircraft fuselage interior 40 with a prior art clip fastener 38 installed. FIG. 4B is an illustration of a cross-sectional top exploded view of the prior art aircraft fuselage interior 40 and clip fastener 38. FIGS. 4A and 4B show the cross-section of the aircraft fuselage interior 40 having a fuselage wall or skin 42 and a first end 44 of an aircraft frame member 46 coupled or attached to the fuselage wall or skin 42. Insulation blankets 48a, 48b are positioned on sides 50a, 50b of the aircraft frame member 46 and between adjacent aircraft frame members 46. The insulation blankets 48a, 48b insulate the fuselage wall or skin 42. The insulation blanket 48a has a plastic film extension tab 52 (see FIG. 4B) that extends along side 50a and around a second end 54 of the aircraft frame member 46. A flexible insulation member 56, for example, in the form of an insulation blanket 58, is attached with tape 60 (see FIG. 4B) to the insulation blanket 48b and wraps over the tab 52 that is covering the second end 54 and sides 50a, 50b of the aircraft frame member 46. The clip fastener 38 is used to secure the insulation blanket 58 to the aircraft frame member 46. FIG. 4A shows an untucked portion 62 of the insulation blanket 58 with installation of the clip fastener 38.

However, using such known fastener devices to secure the insulation to the transport vehicle structure can take time and labor to install, which can increase the cost of installation, labor and manufacturing. Further, using such known fastener devices to secure the insulation to the transport vehicle structure can require procurement and storage of the fastener devices which can take time, space and labor to organize and inventory, and which can, in turn, increase the cost of installation, labor and manufacturing. Moreover, using such known fastener devices to secure the insulation to the transport vehicle structure can add to the overall weight of the transport vehicle, which can, in turn, increase fuel costs.

In addition, known systems and methods for insulating structural components of transport vehicles exist. For example, U.S. Pat. No. 7,040,575 discloses foam composite insulation for aircraft. However, such foam composite insulation does not provide a fastener-free insulation for aircraft frame members themselves.

Accordingly, there is a need in the art for a method and system for insulating a frame member of a vehicle, such as an aircraft, that provide advantages over known methods and systems.

SUMMARY

This need for a method and system for insulating a frame member of a vehicle, such as an aircraft, is satisfied. As discussed in the below detailed description, embodiments of the system and method may provide significant advantages over existing systems and methods.

In an embodiment of the disclosure, there is provided an insulation system for use with transport vehicle structural frame members. The insulation system comprises at least a first structural frame member and adjacent structural frame members in a transport vehicle. Each structural frame member has a first free end, a second end attached to a transport vehicle wall, and two sides disposed between the first free end and the second end. The insulation system further comprises at least one flexible insulation member wrapped over the first free end of the first structural frame member and over at least portions of the two sides of the first structural frame member.

The insulation system further comprises at least first and second self-retaining foam insulation members positioned on each side of the wrapped first structural frame member and disposed in compression fit between each side of the wrapped first structural frame member and each of the adjacent structural frame members. The first and second self-retaining foam insulation members impart one or more compression forces on the flexible insulation member to secure the flexible insulation member in place without use of any fastener device.

The transport vehicle may comprise an aircraft, an aerospace vehicle, a space launch vehicle, a rocket, a satellite, a rotorcraft, a watercraft, a boat, a train, an automobile, a truck, or a bus. The system may further comprise multiple structural frame members positioned in parallel along a length of one or more transport vehicle walls. Each of the multiple structural frame members may be wrapped with the at least one flexible insulation member, and each of the at least one flexible insulation members may be secured in place by each of the at least first and second self-retaining foam insulation members disposed in compression fit between the one or more adjacent structural frame members. The at least first and second self-retaining foam insulation members may comprise an open cell foam; a polymeric, cellular solid foam; a melamine foam; or a closed cell foam.

In another embodiment of the disclosure, there is provided a method of insulating a structural frame member of a transport vehicle. The method comprises providing at least one flexible insulation member. The method further comprises providing at least two self-retaining foam insulation members. The method further comprises coupling with a coupling element a first end of the at least one flexible insulation member to one of the at least two self-retaining foam insulation members.

The method further comprises wrapping the flexible insulation member over a first end of a structural frame member of a transport vehicle and over at least portions of two sides of the structural frame member. The method further comprises positioning one self-retaining foam insulation member on each side of the wrapped structural frame member and in compression fit between each side of the wrapped structural frame member and adjacent structural frame members, such that the self-retaining foam insulation members impart one or more compression forces on the flexible insulation member to secure the flexible insulation member in place without use of any fastener device.

The positioning of the one self-retaining foam insulation member may further comprise retaining a second end of the at least one flexible insulation member in between one side of the structural frame member and an end of one of the at least two self-retaining foam insulation members. The structural frame member and adjacent structural frame members may be coupled to a transport vehicle wall. The flexible insulation member may comprise an insulation blanket, fiberglass batting, fiberglass batting inside a plastic covering, an insulating fabric material, a flexible polyimide foam, or a flexible melamine foam. The at least two self-retaining foam insulation members may comprise an open cell foam; a polymeric, cellular solid foam; a melamine foam; or a closed cell foam.

The method may insulate multiple structural frame members in parallel along a length of one or more transport vehicle walls, and each structural frame member may be wrapped with the at least one flexible insulation member, and each flexible insulation member may be secured in place by the at least two self-retaining foam insulation members disposed in compression between adjacent structural frame members. The method preferably eliminates the use of fastener devices to secure the at least one flexible insulation member in place, and preferably reduces manufacturing costs and weight of the transport vehicle by not having to use the fastener devices.

In another embodiment of the disclosure, there is provided an aircraft frame member insulation system in an aircraft. The aircraft frame member insulation system comprises at least a first aircraft frame member and one or more adjacent aircraft frame members positioned in an aircraft interior. Each of the aircraft frame members has a first free end, a second end attached to an aircraft fuselage wall, and two sides disposed between the first free end and the second end. The aircraft frame member insulation system further comprises at least one flexible insulation member wrapped over the first free end of the first aircraft frame member and over at least portions of the two sides of the aircraft frame member to obtain a wrapped first aircraft frame member.

The aircraft frame member insulation system further comprises at least first and second self-retaining foam insulation members positioned on each side of the wrapped first aircraft frame member and disposed in compression fit between each side of the wrapped first aircraft frame member and each of the one or more adjacent aircraft frame members. The first and second self-retaining foam insulation members impart one or more compression forces on the at least one flexible insulation member to secure the at least one flexible insulation member in place without use of any fastener device.

The aircraft frame member insulation system may further comprise multiple aircraft frame members positioned in parallel along a length of one or more aircraft fuselage walls. Each of the multiple aircraft frame members may be wrapped with the at least one flexible insulation member, and each of the at least one flexible insulation members may be secured in place by each of the at least first and second self-retaining foam insulation members disposed in compression fit between the one or more adjacent aircraft frame members. The at least first and second self-retaining foam insulation members may comprise an open cell foam; a polymeric, cellular solid foam; a melamine foam; or a closed cell foam.

The aircraft frame member insulation system may further comprise an insulation assembly comprising the at least one flexible insulation member, one of the self-retaining foam insulation members, and a coupling element configured to couple the at least one flexible insulation member to the self-retaining form insulation member. The coupling element may comprise an adhesive tape, a hook and loop tape, a glue, or a plastic bag configured to fit snugly around the at least one flexible insulation member and the self-retaining foam insulation member. Each of the at least first and second self-retaining foam insulation members preferably has a density of from about 0.3 pounds per cubic foot to about 1.5 pounds per cubic foot. The at least one flexible insulation member may comprise an insulation blanket, fiberglass batting, fiberglass batting inside a plastic covering, an insulating fabric material, a flexible polyimide foam, or a flexible melamine foam.

In another embodiment of the disclosure, there is provided a method of insulating a structural frame member of a transport vehicle. The method comprises providing at least one flexible insulation member. The method further comprises providing at least two self-retaining foam insulation members. The method may further comprise optionally coupling a first end of the flexible insulation member to one of the self-retaining foam insulation members. The method further comprises wrapping the flexible insulation member over a first end of a structural frame member of a transport vehicle and over at least portions of two sides of the structural frame member. The method further comprises positioning one self-retaining foam insulation member on each side of the wrapped structural frame member and in compression fit between each side of the wrapped structural frame member and adjacent structural frame members, such that the self-retaining foam insulation members impart one or more compression forces on the flexible insulation member to secure the flexible insulation member in place without use of any fastener device.

In another embodiment of the disclosure, there is provided a method of insulating an aircraft frame member. The method comprises providing at least one flexible insulation member having a first end and a second end. The method further comprises providing at least first and second self-retaining foam insulation members each having a first end and a second end. The method may further comprise optionally coupling the first end of the flexible insulation member to the second end of the first self-retaining foam insulation member. The method further comprises wrapping the flexible insulation member over a first end of an aircraft frame member and over at least portions of two sides of the aircraft frame member. The method further comprises positioning the first and second self-retaining foam insulation members on each side of the wrapped aircraft frame member and in compression fit between each side of the wrapped aircraft frame member and adjacent aircraft frame members. The method further comprises retaining the second end of the flexible insulation member in between one side of the wrapped aircraft frame member and the first end of the second self-retaining foam insulation member, such that the second self-retaining foam insulation member imparts one or more compression forces on the second end of the flexible insulation member to secure the second end of the flexible insulation member in place without use of any fastener device.

In another embodiment of the disclosure, there is provided a transport vehicle structural frame member insulation system. The system comprises at least a first structural frame member and adjacent structural frame members in a transport vehicle. Each structural frame member having a first free end, a second end attached to a transport vehicle wall, and two sides disposed between the first free end and the second end. The system further comprises at least one flexible insulation member wrapped over the first free end of the first structural frame member and over at least portions of the two sides of the first structural frame member. The system further comprises at least first and second self-retaining foam insulation members positioned on each side of the wrapped first structural frame member and disposed in compression fit between each side of the wrapped first structural frame member and each of the adjacent structural frame members. The first and second self-retaining foam insulation members impart one or more compression forces on the flexible insulation member to secure the flexible insulation member in place without use of any fastener device.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
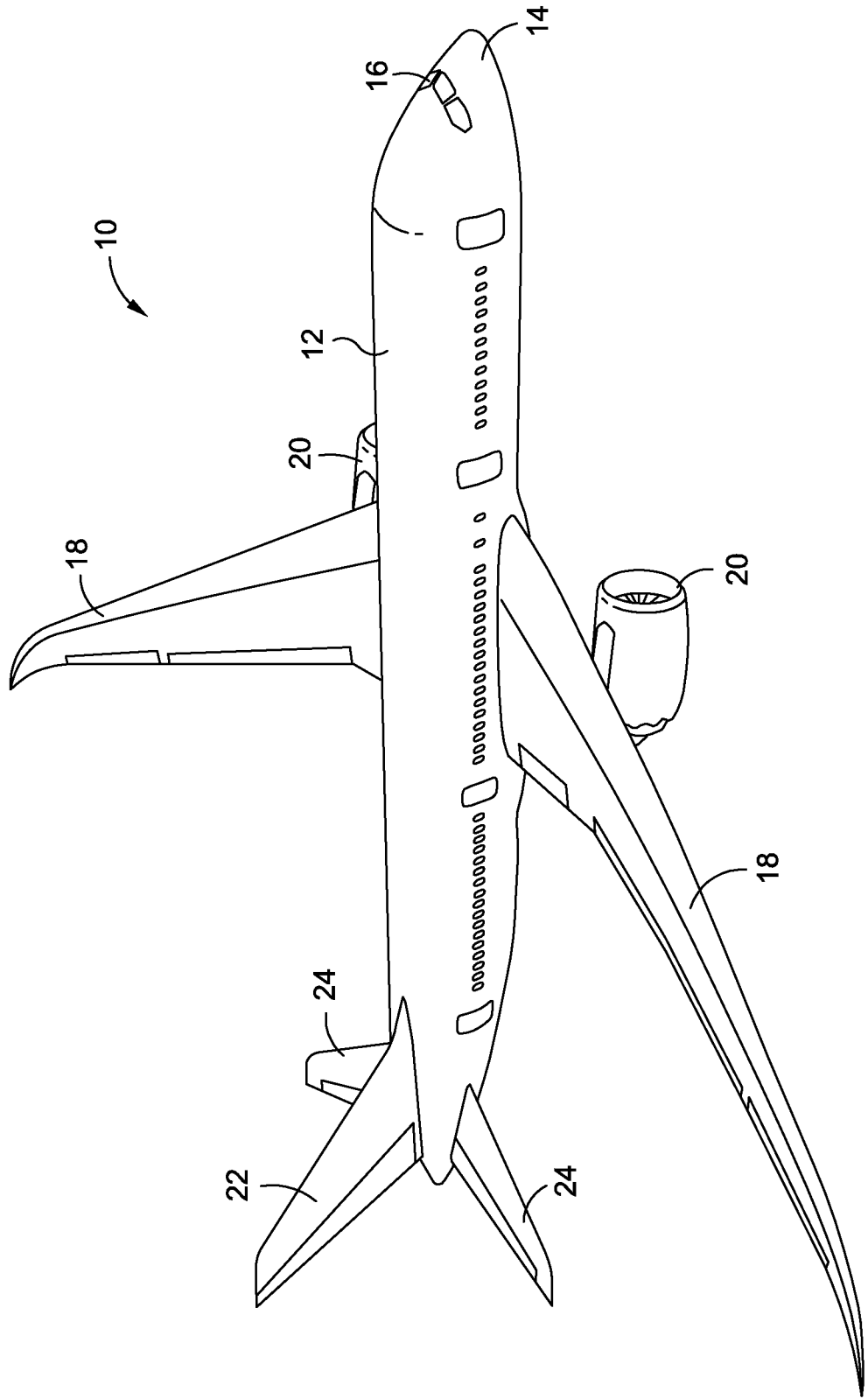
FIG. 1 is an illustration of a perspective view of an exemplary prior art aircraft for which one of the embodiments of an insulation system and method of the disclosure may be used.
Figure 2:
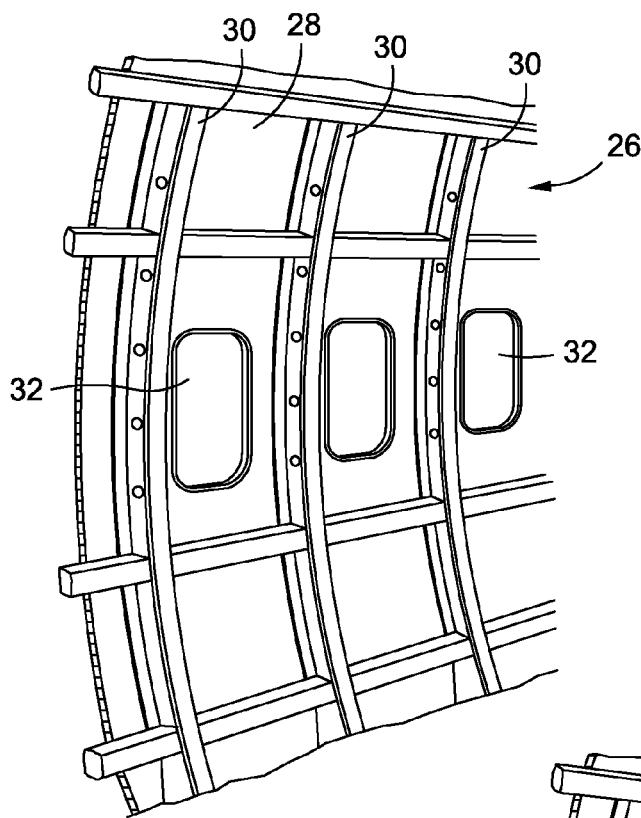
FIG. 2 is an illustration of a partial front perspective view of a prior art aircraft fuselage interior.

Now referring to the Figures, FIG. 1 is an illustration of a perspective view of an exemplary prior art aircraft 10 for which one of the embodiments of an insulation system 100 (see FIGS. 7, 8), insulation system 150 (see FIG. 5A, 5B), insulation method 200 (see FIG. 9), and insulation method 300 (see FIG. 10) may be used. The aircraft 10 comprises a fuselage 12, a nose 14, a cockpit 16, wings 18 operatively coupled to the fuselage 12, one or more propulsion units 20, a tail vertical stabilizer 22, and one or more tail horizontal stabilizers 24. Although the aircraft 10 shown in FIG. 1 is generally representative of a commercial passenger aircraft, the insulation systems 100, 150 and methods 200, 300 disclosed herein may also be employed in the insulation of other types of aircraft. More specifically, the teachings of the disclosed embodiments may be applied to the insulation of other passenger aircraft, cargo aircraft, military aircraft, rotorcraft, and other types of aircraft or aerial vehicles, as well as aerospace vehicles such as satellites, space launch vehicles, rockets, and other types of aerospace vehicles. It may also be appreciated that embodiments of systems, methods and apparatuses in accordance with the disclosure may be utilized in other vehicles, such as boats and other watercraft, trains, automobiles, trucks, buses, and other types of vehicles. The embodiments of systems, methods and apparatuses in accordance with the disclosure may also be used in buildings, houses, and other architectural structures.

Figure 7:
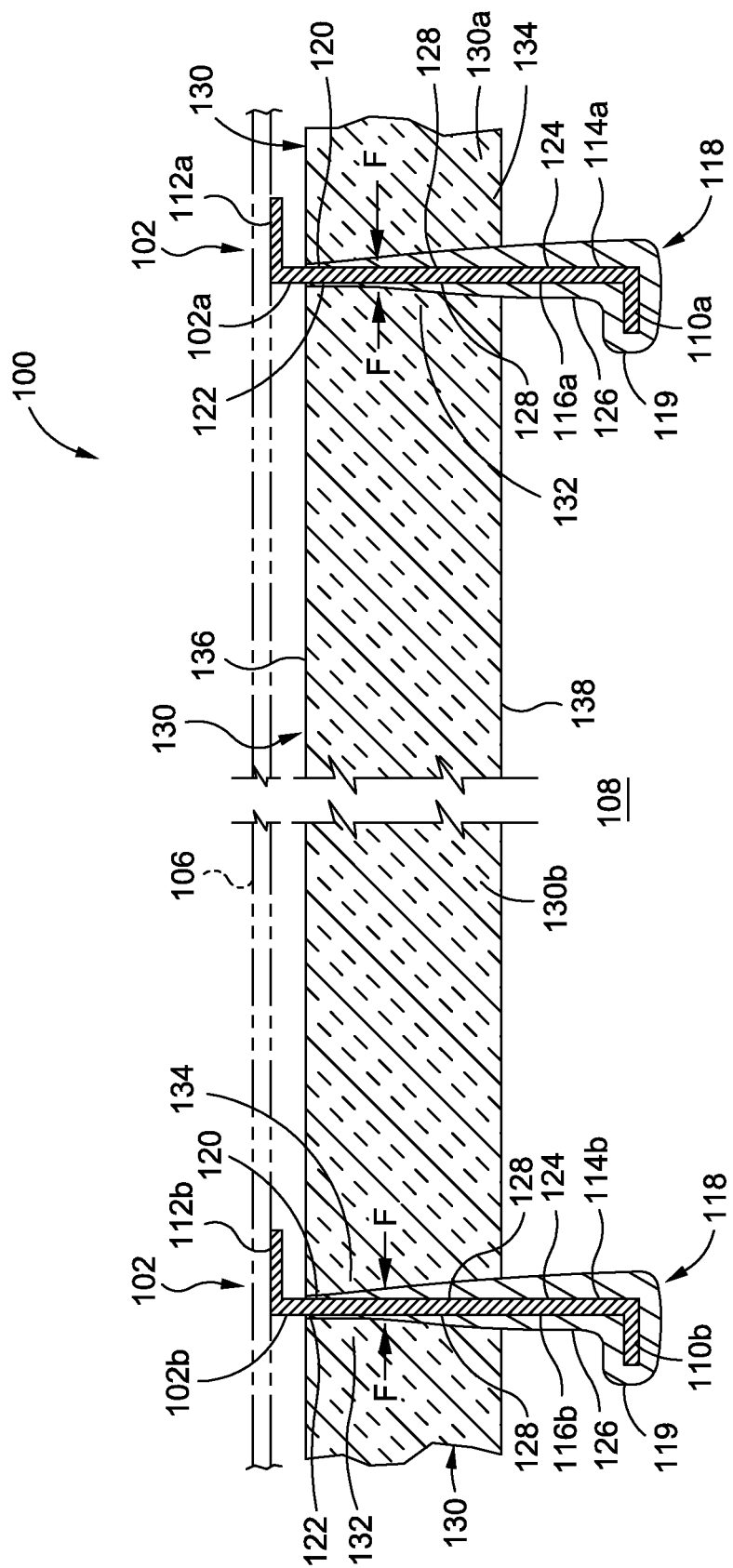
FIG. 7 is an illustration of a cross-sectional top view of another one of the exemplary embodiments of an insulation system of the disclosure.
Figure 8:
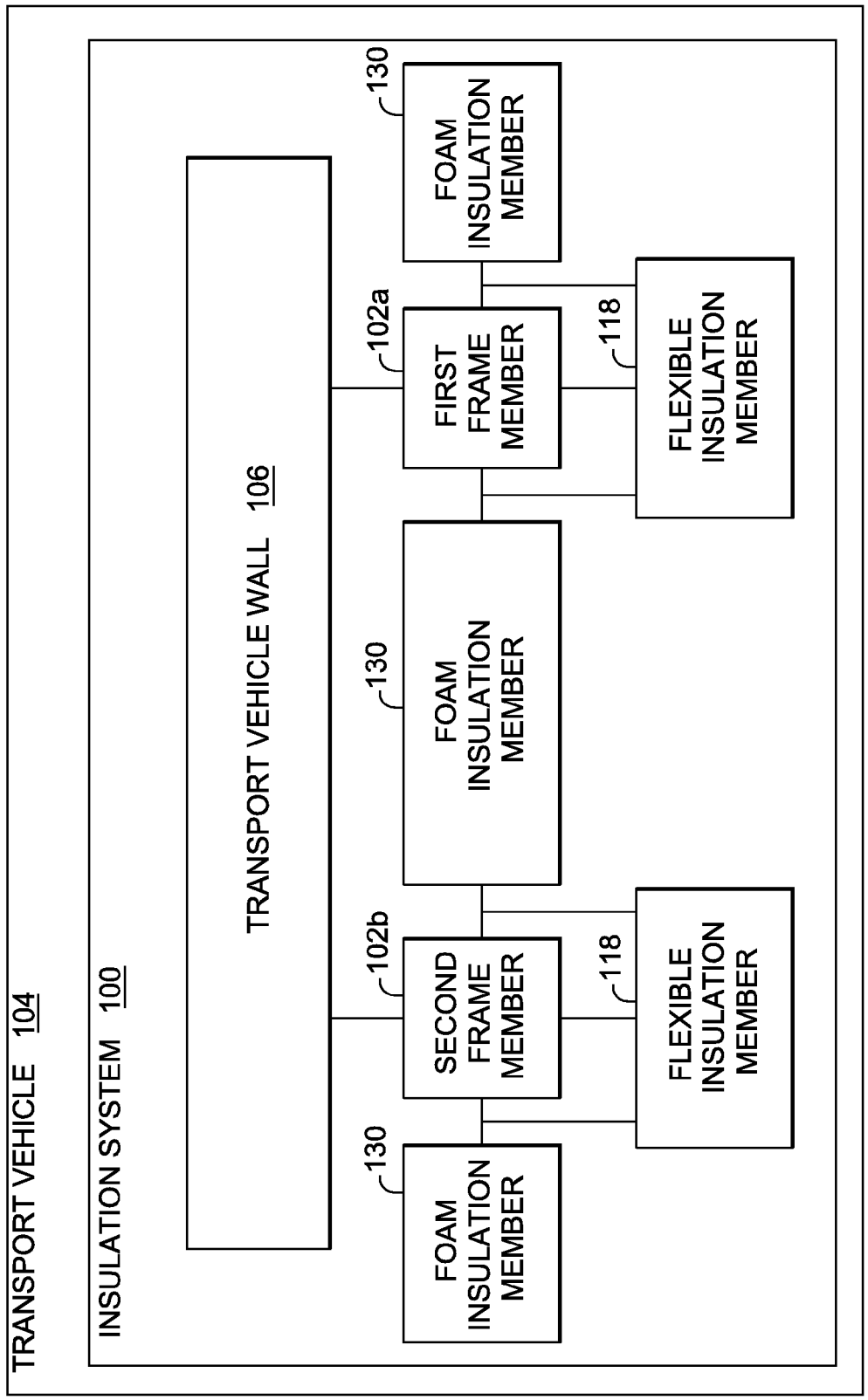
FIG. 8 is an illustration of a functional block diagram of another one of the exemplary embodiments of an insulation system of the disclosure.

In one embodiment of the disclosure, there is provided an insulation system 100 for a structural frame member 102 of a transport vehicle 104 (see FIG. 8). FIG. 8 is an illustration of a functional block diagram of one of the exemplary embodiments of the insulation system 100 of the disclosure. FIG. 7 is an illustration of a cross-sectional top view of one of the exemplary embodiments of the insulation system 100 of the disclosure. The insulation system 100 is preferably for use in a transport vehicle 104 (see FIG. 8). The transport vehicle 104 may comprise an aircraft 10 (see FIG. 1), an aerospace vehicle, a space launch vehicle, a rocket, a satellite, a rotorcraft, a watercraft, a boat, a train, and automobile, a truck, a bus, or another suitable transport vehicle. Preferably, the transport vehicle 104 is an aircraft 10 (see FIG. 1).

As shown in FIGS. 7 and 8, the insulation system 100 comprises one or more structural frame members 102 in a transport vehicle 104. Preferably, the insulation system 100 comprises at least a first structural frame member 102a and one or more adjacent structural frame members, such as an adjacent second structural frame member 102b in a transport vehicle 104. In one exemplary embodiment, the insulation system 100 may comprise multiple structural frame members 102 positioned in parallel along a length of one or more transport vehicle walls 106 in a vehicle interior 108. As shown in FIG. 7, each first and second structural frame member 102a, 102b comprises a first free end 110a, 110b and a second end 112a, 112b attached to a transport vehicle wall 106. The first structural frame member 102a comprises a first side 114a and a second side 116a disposed between the first free end 110a and the second end 112a. The second structural frame member 102b comprises a first side 114b and a second side 116b disposed between the first free end 110b and the second end 112b. In another exemplary embodiment, as discussed further below, the structural frame member 102 comprises an aircraft frame member 152 (see FIGS. 5A, 5B). The structural frame members 102 are preferably stiffening members that may be made of metals, such as aluminum, titanium, steel, alloys thereof, or other metals, or composite materials, such as carbon fiber reinforced plastics, aramid fiber reinforced plastics, polymer matrix composite material, polyurethanes, or other composite materials, or other suitable materials.

Figure 6:
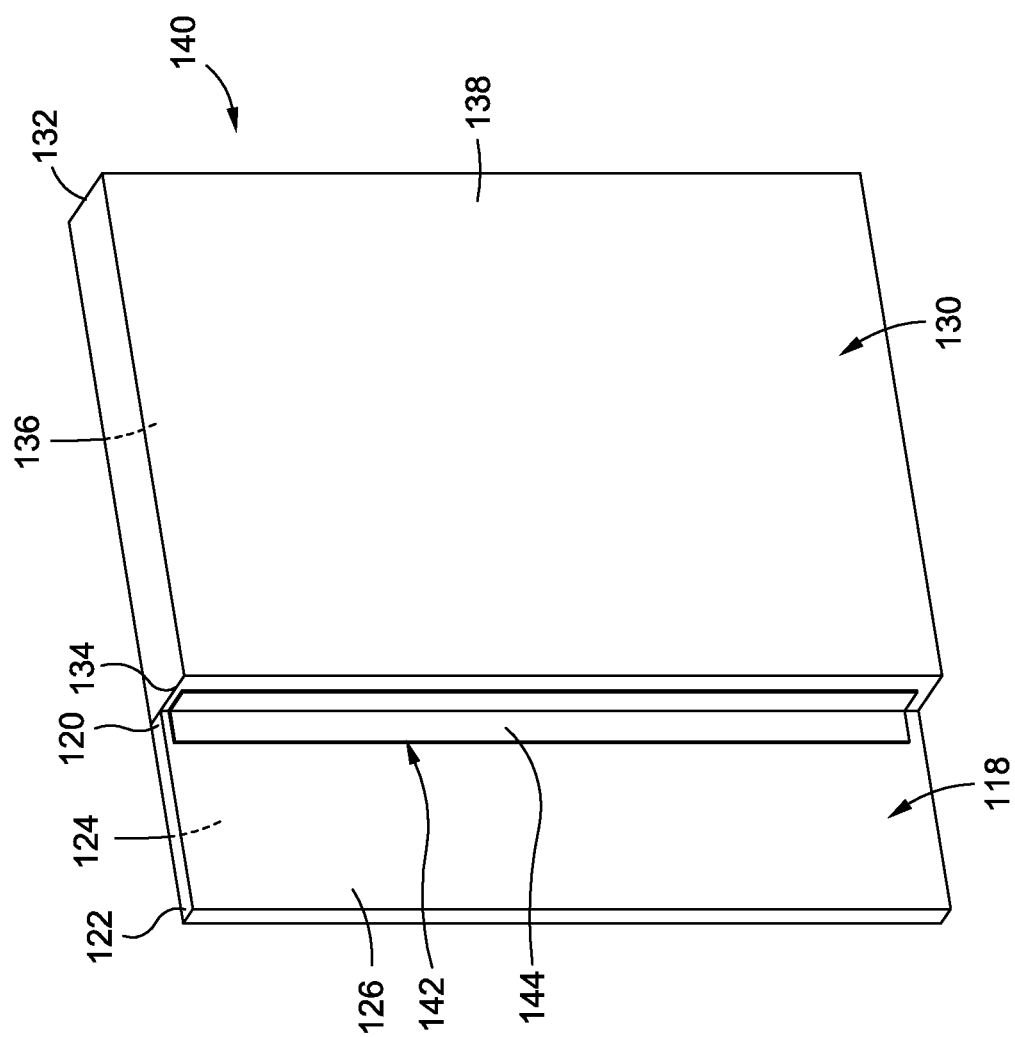
FIG. 6 is an illustration of a front perspective view of an exemplary embodiment of an insulation assembly that may be used in the system and method of the disclosure.

As shown in FIGS. 6, 7 and 8, the insulation system 100 further comprises at least one flexible insulation member 118. As shown in FIG. 6, the flexible insulation member 118 has a first end 120, a second end 122, a first side 124, and a second side 126. As shown in FIG. 7, one flexible insulation member 118 is preferably positioned or wrapped over the first free end 110a of the first structural frame member 102a and over at least portions 128 of the two first and second sides 114a, 116a of the first structural frame member 102a to obtain a wrapped first structural frame member. Another flexible insulation member 118 may be positioned or wrapped over the first free end 110b of the second structural frame member 102b and over at least portions 128 of the two first and second sides 114b, 116b of the second structural frame member 102b to obtain a wrapped second structural frame member. The flexible insulation member 118 may comprise an insulation blanket 119 (see FIG. 7). The flexible insulation member 118 may be made of fiberglass batting, fiberglass batting inside a plastic covering, an insulating fabric material, a flexible foam, such as polyimide or melamine foam, or another suitable material.

As shown in FIG. 7, the first side 124 of the flexible insulation member 118 is preferably interior to and adjacent the portions 128 of the two first and second sides 114a, 116a of the first structural frame member 102a, and the second side 126 of the flexible insulation member 118 is preferably exterior to the first structural frame member 102a. Similarly, the first side 124 of the flexible insulation member 118 is preferably interior to and adjacent the portions 128 of the two first and second sides 114b, 116b of the second structural frame member 102b, and the second side 126 of the flexible insulation member 118 is preferably exterior to the second structural frame member 102b. In one exemplary embodiment, the insulation system 100 may comprise multiple flexible insulation members 118 positioned or wrapped over multiple corresponding structural frame members 102 positioned in parallel along a length of one or more transport vehicle walls 106 in a vehicle interior 108.

As shown in FIGS. 6, 7 and 8, the insulation system 100 further comprises at least two self-retaining foam insulation members 130, for example, as shown in FIG. 7, first self-retaining foam insulation member 130a and second self-retaining foam insulation member 130b. As shown in FIG. 6, each self-retaining foam insulation member 130 has a first end 132, a second end 134, a first side 136, and a second side 138. Preferably, the at least first and second self-retaining foam insulation members 130a, 130b are individually positioned on each side of the first structural frame member 102a wrapped with the flexible insulation member 118. Preferably, the at least first and second self-retaining foam insulation members 130a, 130b are disposed in compression fit between each side of the first structural frame member 102a wrapped with the flexible insulation member 118 and each of the adjacent structural frame members, such as adjacent second structural frame member 102b.

Figure 3:
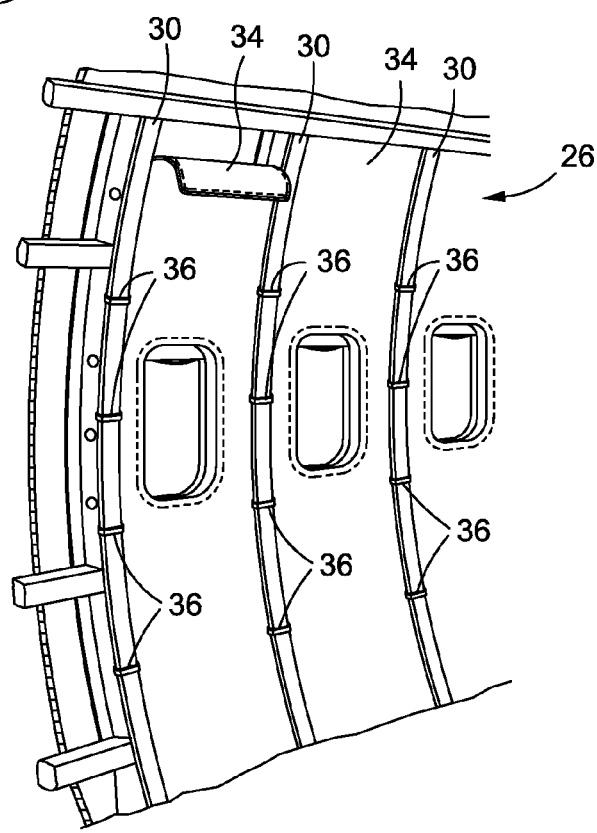
FIG. 3 is an illustration of a partial front perspective view of the aircraft fuselage interior of FIG. 2 showing a prior art insulation blanket secured with prior art fastener devices.
Figure 4A:
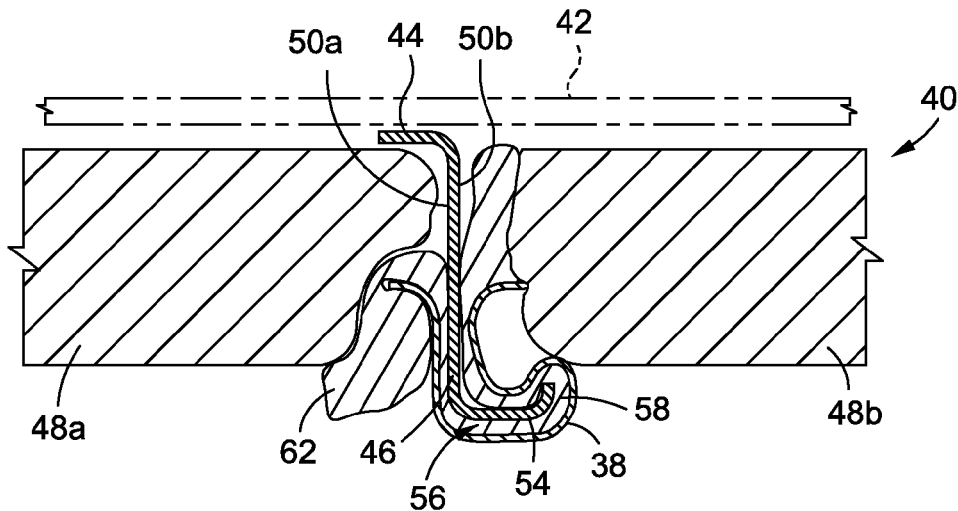
FIG. 4A is an illustration of a cross-sectional top view of a portion of a prior art airplane fuselage with a prior art clip fastener installed.
Figure 4B:
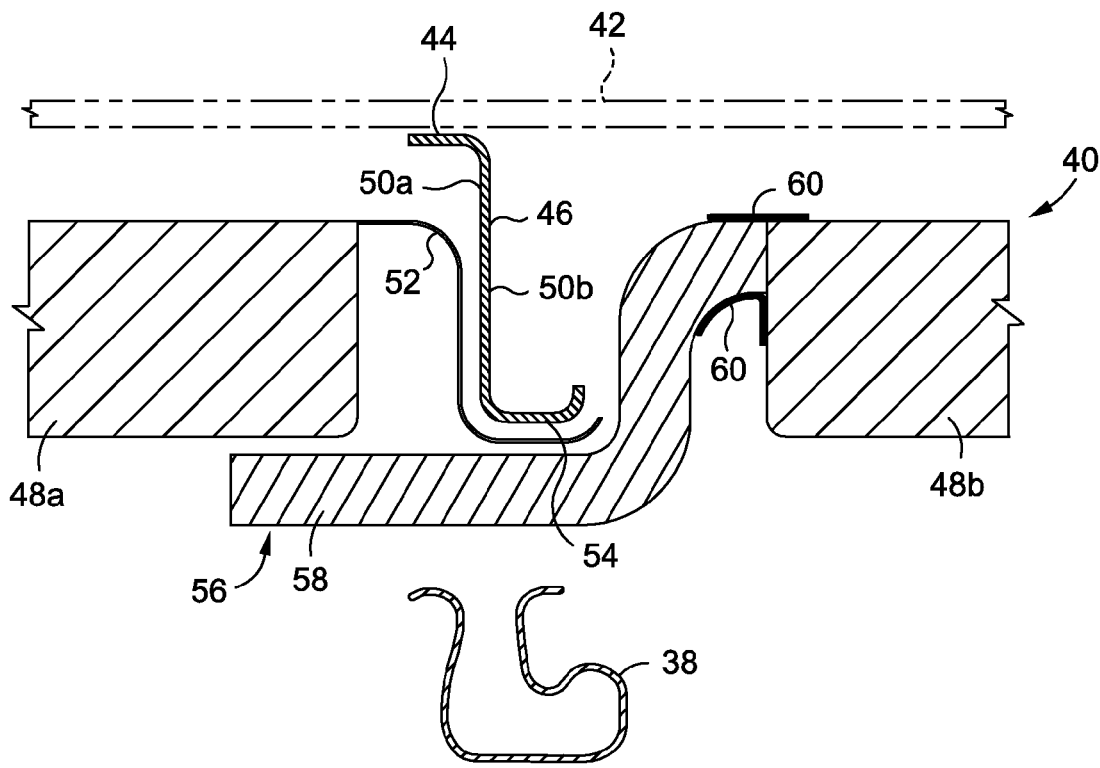
FIG. 4B is an illustration of a cross-sectional top exploded view of the prior art airplane fuselage and clip fastener of FIG. 4A.

The first and second self-retaining foam insulation members 130a, 130b impart one or more compression forces ←F, F→ (see FIG. 7) on the flexible insulation member 118 to secure the flexible insulation member 118 in place without use of any fastener device 36 (see FIG. 3) such as clip fasteners 38 (see FIGS. 4A-4B). As shown in FIG. 7, a first self-retaining foam insulation member 130a imparts a compression force ←F on and against the first end 120 of the flexible insulation member 118 to compress the flexible insulation member 118 on and against the first structural frame member 102a in order to secure the first end 120 of the flexible insulation member 118 in place against the first structural frame member 102a without use of any fastener devices 36 (see FIG. 3) such as clip fasteners 38 (see FIGS. 4A-4B). As further shown in FIG. 7, a second self-retaining foam insulation member 130b is disposed in compression and extends between the first structural frame member 102a and the second structural frame member 102b. The first end 132 of the second self-retaining foam insulation member 130b imparts a compression force F→ on and against the second end 122 of the flexible insulation member 118 wrapped around the first structural frame member 102a to compress the flexible insulation member 118 against the first structural frame member 102a in order to secure the second end 122 of the flexible insulation member 118 in place against the first structural frame member 102a without use of any fastener devices 36 (see FIG. 3) such as clip fasteners 38 (see FIGS. 4A-4B). The second end 134 of the second self-retaining foam insulation member 130b imparts a compression force ←F on and against the first end 120 of the flexible insulation member 118 wrapped around the second structural frame member 102b to compress the flexible insulation member 118 against the second structural frame member 102b in order to secure the first end 120 of the flexible insulation member 118 in place against the second structural frame member 102b without use of any fastener devices 36 (see FIG. 3) such as clip fasteners 38 (see FIGS. 4A-4B).

As shown in FIG. 7, the second self-retaining foam insulation member 130b is held between adjacent structural frame members 102a, 102b by the compression forces ←F, F→, where the self-retaining foam insulation member 130b exerts a compression force F→ on the second side 116a of the first structural frame member 102a and exerts a compression force ←F on the first side 114b of the second structural frame member 102b. As shown in FIGS. 7, 8, the insulation system 100 may comprise multiple self-retaining foam insulation members 130 disposed in compression between adjacent structural frame members 102 in parallel along a length of one or more transport vehicle walls 106 of the transport vehicle 104, wherein each frame member 102 is wrapped with the flexible insulation member 118 and each flexible insulation member 118 is secured in place by the self-retaining foam insulation members 130 disposed in compression between the adjacent structural frame members 102.

Each self-retaining foam insulation member 130 is preferably substantially rigid and self-retaining and may comprise an open cell foam (preferred for aircraft); a polymeric, cellular solid foam; a melamine foam; a closed cell foam; or another suitable self-retaining foam. Preferably, the self-retaining foam insulation member 130 has a density of from about 0.3 pounds per cubic foot to about 1.5 pounds per cubic foot. More preferably, the self-retaining foam insulation member 130 has a density of less than 0.4 pounds per cubic feet. Preferably, the self-retaining foam insulation member 130 is made of a material that is water resistant and lightweight. The self-retaining form insulation member 130 may comprise a foam composite insulation as disclosed in U.S. Pat. No. 7,040,575 B2, which is incorporated by reference herein in its entirety.

FIG. 6 is an illustration of a front perspective view of an exemplary embodiment of an insulation assembly 140 that may be used in the insulation system 100 and methods 200, 300 of the disclosure. The insulation assembly 140 comprises the flexible insulation member 118 coupled to the self-retaining foam insulation member 130 with a coupling element 142. The coupling element 142 may comprise tape 144, such as an adhesive tape or a hook and loop tape; a glue or other type of adhesive; or another suitable coupling or attachment element. As shown in FIG. 6, the first end 120 of the flexible insulation member 118 is coupled to the second end 134 of the self-retaining foam insulation member 130 with tape 144. Alternatively, the flexible insulation member 118 may be coupled to the self-retaining foam insulation member 130 with a coupling element in the form of a plastic bag (not shown) designed to fit snugly around the flexible insulation member 118 and the second self-retaining foam insulation member 130 in order to couple and retain them together.

The insulation system 100 eliminates the cost of using any fastener devices 36 (see FIG. 3) such as clip fasteners 38 (see FIGS. 4A-4B) to secure the flexible insulation members 118 to the structural frame members 102, such as first structural frame member 102a and the second structural frame member 102b, and reduces the manufacturing costs and weight of the transport vehicle 104 by not having to use the fastener devices 36 (see FIG. 3) such as clip fasteners 38 (see FIGS. 4A-4B).

Figure 5A:
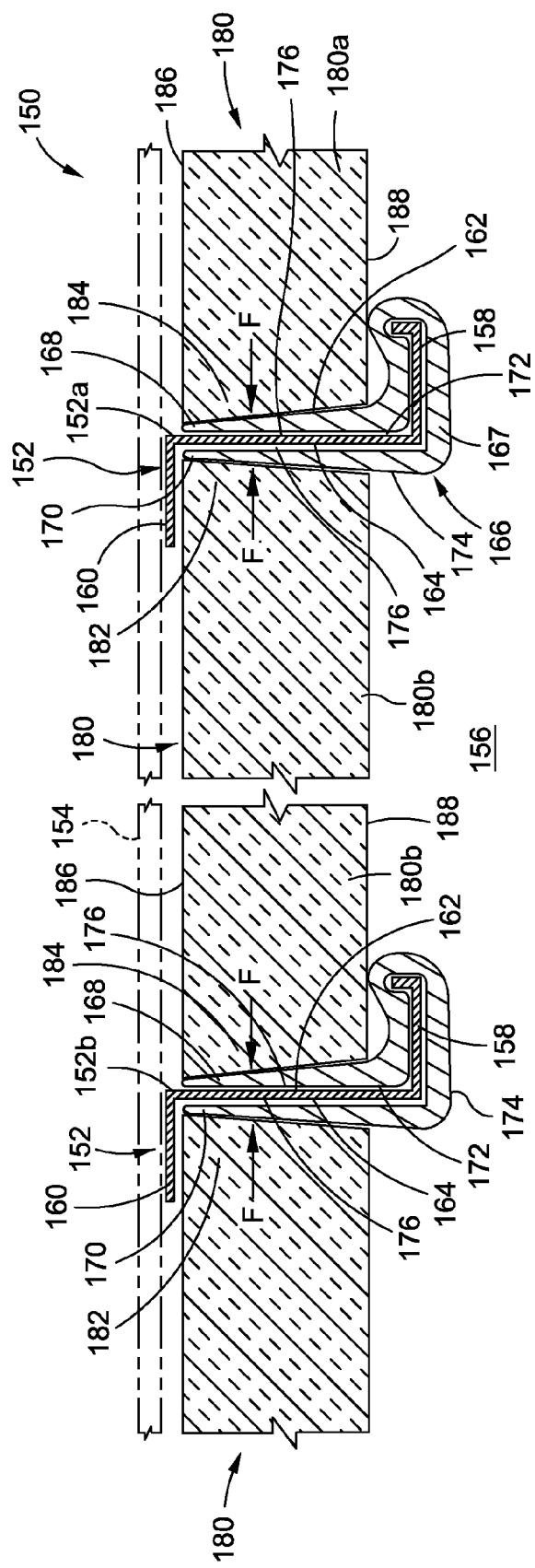
FIG. 5A is a cross-sectional top view of one of the exemplary embodiments of an insulation system of the disclosure.

In another one of the embodiments of the disclosure, there is provided an insulation system 150 for an aircraft frame member 152 of an aircraft 10 (see FIG. 1). FIG. 5A is a cross-sectional top view of one of the exemplary embodiments of the insulation system 150 for the aircraft frame member 152 of the aircraft 10 (see FIG. 1) of the disclosure.

Figure 5B:
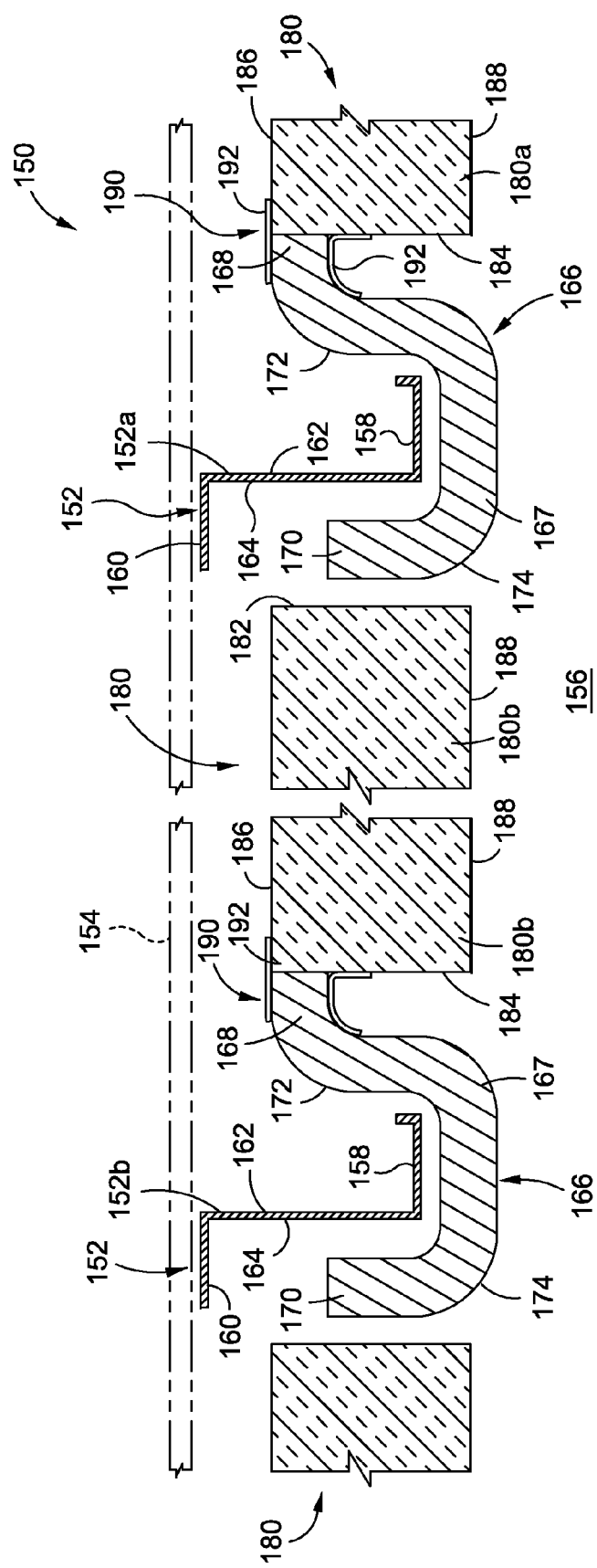
FIG. 5B is an illustration of a cross-sectional top exploded view of the insulation system of FIG. 5A.

FIG. 5B is an illustration of a cross-sectional top exploded view of the insulation system 150 of FIG. 5A.

As shown in FIGS. 7 and 8, the insulation system 100 comprises one or more structural frame members 102 in a transport vehicle 104.

As shown in FIGS. 5A, 5B, the insulation system 150 comprises one or more aircraft frame members 152 in an aircraft 10. Preferably, the insulation system 150 comprises at least a first aircraft frame member 152a and one or more adjacent aircraft frame members, such as an adjacent second aircraft frame member 152b in an aircraft interior 156. In one exemplary embodiment, the insulation system 150 may comprise multiple aircraft frame members 152 positioned in parallel along a length of one or more aircraft fuselage walls or skins 154 in the aircraft interior 156. As shown in FIGS. 5A, 5B, each aircraft frame member 152 comprises a first free end 158 and a second end 160 attached to the aircraft fuselage wall or skin 154. Each aircraft frame member 152 further comprises a first side 162 and a second side 164 both disposed between the first free end 158 and the second end 160.

As shown in FIGS. 5A, 5B, the insulation system 150 further comprises at least one flexible insulation member 166 having a first end 168, a second end 170, a first side 172, and a second side 174. One flexible insulation member 166 is preferably positioned or wrapped over the first free end 158 of first aircraft frame member 152a and over at least portions 176 of the two first and second sides 162, 164 of the first aircraft frame member 152a to obtain a wrapped first aircraft frame member. Another flexible insulation member 166 may be positioned or wrapped over the first free end 158 of second aircraft frame member 152b and over at least portions 176 of the two first and second sides 162, 164 of the second aircraft frame member 152b to obtain a wrapped second aircraft frame member. The first side 172 of the flexible insulation member 166 is preferably interior to and adjacent the portions 176 of the two first and second sides 162, 164 of the aircraft frame member 152, and the second side 174 of the flexible insulation member 166 is preferably exterior to the aircraft frame member 152. In one exemplary embodiment, the insulation system 150 may comprise multiple flexible insulation members 166 positioned or wrapped over multiple corresponding aircraft frame members 152 positioned in parallel along a length of one or more aircraft fuselage walls or skins 154 in an aircraft interior 156. The flexible insulation member 166 may comprise an insulation blanket 167 (see FIGS. 5A, 5B). The flexible insulation member 166 may be comprised of fiberglass batting, fiberglass batting inside a plastic covering, an insulating fabric material, a flexible foam such as polyimide or melamine foam, or another suitable material.

As shown in FIGS. 5A, 5B, the insulation system 150 further comprises at least two self-retaining foam insulation members 180, for example, as shown in FIG. 5A, first self-retaining foam insulation member 180a and second self-retaining foam insulation member 180b. As shown in FIGS. 5A, 5B, each first and second self-retaining foam insulation member 180a, 180b has a first end 182, a second end 184, a first side 186, and a second side 188. Preferably, the at least first and second self-retaining foam insulation members 180a, 180b are individually positioned on each side of the first aircraft frame member 152a wrapped with the flexible insulation member 166. Preferably, the at least first and second self-retaining foam insulation members 180a, 180b are disposed in compression fit between each side of the first aircraft frame member 152a wrapped with the flexible insulation member 166 and each of the adjacent aircraft frame members, such as adjacent second aircraft frame member 152b.

As shown in FIG. 5B, the first end 168 of the flexible insulation member 166 is coupled to a second end 184 of the first self-retaining foam insulation member 180a. As further shown in FIG. 5B, the second self-retaining foam insulation member 180b is preferably disposed in compression and extends between the aircraft frame members 152a, 152b. As shown in FIG. 5A, the second end 184 of the first self-retaining foam insulation member 180a imparts a compression force ←F on and against the first end 168 of the flexible insulation member 166 wrapped around the first aircraft frame member 152a to compress the flexible insulation member 166 on and against the first aircraft frame member 152a in order to secure the first end 168 of the flexible insulation member 166 in place against the first aircraft frame member 152a without use of any fastener devices 36 (see FIG. 3) such as clip fasteners 38 (see FIGS. 4A-4B). As further shown in FIG. 5A, the first end 182 of the second self-retaining foam insulation member 180b imparts a compression force F→ on and against the second end 170 of the flexible insulation member 166 wrapped around the first aircraft frame member 152a to compress the flexible insulation member 166 against the aircraft frame member 152a in order to secure the second end 170 of the flexible insulation member 166 in place against the first aircraft frame member 152a without use of any fastener devices 36 (see FIG. 3) such as clip fasteners 38 (see FIGS. 4A-4B). The second end 184 of the second self-retaining foam insulation member 180b imparts a compression force ←F on and against the first end 168 of the flexible insulation member 166 wrapped around the second aircraft frame member 152b to compress the flexible insulation member 166 against the second aircraft frame member 152b in order to secure the first end 168 of the flexible insulation member 166 in place against the second aircraft frame member 152b without use of any fastener devices 36 (see FIG. 3) such as clip fasteners 38 (see FIGS. 4A-4B).

The insulation system 150 may comprise multiple self-retaining foam insulation members 166 disposed in compression between adjacent aircraft frame members 152 in parallel along a length of one or more aircraft fuselage walls 154 of the aircraft 10, wherein each aircraft frame member 152 is wrapped with the flexible insulation member 166 and each flexible insulation member 166 is secured in place by the self-retaining foam insulation members 180a, 180b. The self-retaining foam insulation members 180a, 180b is preferably substantially rigid and self-retaining and may comprise an open cell foam (preferred for aircraft); a polymeric, cellular solid foam; a melamine foam; a closed cell foam; or another suitable self-retaining foam. Preferably, the self-retaining foam insulation members 180a, 180b have a density of from about 0.3 pounds per cubic foot to about 1.5 pounds per cubic foot. More preferably, the self-retaining foam insulation members 180a, 180b have a density of less than 0.4 pounds per cubic feet. Preferably, the self-retaining foam material is water resistant and lightweight. The self-retaining foam insulation members 180a, 180b may comprise a foam composite insulation as disclosed in U.S. Pat. No. 7,040,575 B2, which is incorporated by reference herein in its entirety.

As shown in FIG. 5B, the first end 168 of the flexible insulation member 166 may be coupled to the second end 184 of the first self-retaining foam insulation member 180a with a coupling element 190. The coupling element 190 may comprise tape 192, such as an adhesive tape or a hook and loop tape; a glue or other type of adhesive; or another suitable coupling or attachment element. Alternatively, the flexible insulation member 166 may be coupled to the second end 184 of the first self-retaining foam insulation member 180a with a coupling element in the form of a plastic bag (not shown) designed to fit snugly around the flexible insulation member 166 and the first self-retaining foam insulation member 180a in order to couple and retain them together. As shown in FIG. 5B, the flexible insulation member 166 that covers the first aircraft frame member 152a may be preferably secured on the first end 168 with the tape 192 by taping it to the second end 184 of the first self-retaining foam insulation member 180a. The flexible insulation member 166 may be preferably secured on the second end 170 by tucking it between the first end 182 of the second self-retaining foam insulation member 180b and the second side 164 of the first aircraft frame member 152a. As shown in FIG. 5A, the second end 170 of the flexible insulation member 166 wrapped around the first aircraft frame member 152a is held in place by the compression force F→ on and against the second end 170 of the flexible insulation member 166 and on and against the first aircraft frame member 152a by the second self-retaining foam insulation members 180b.

Figure 9:
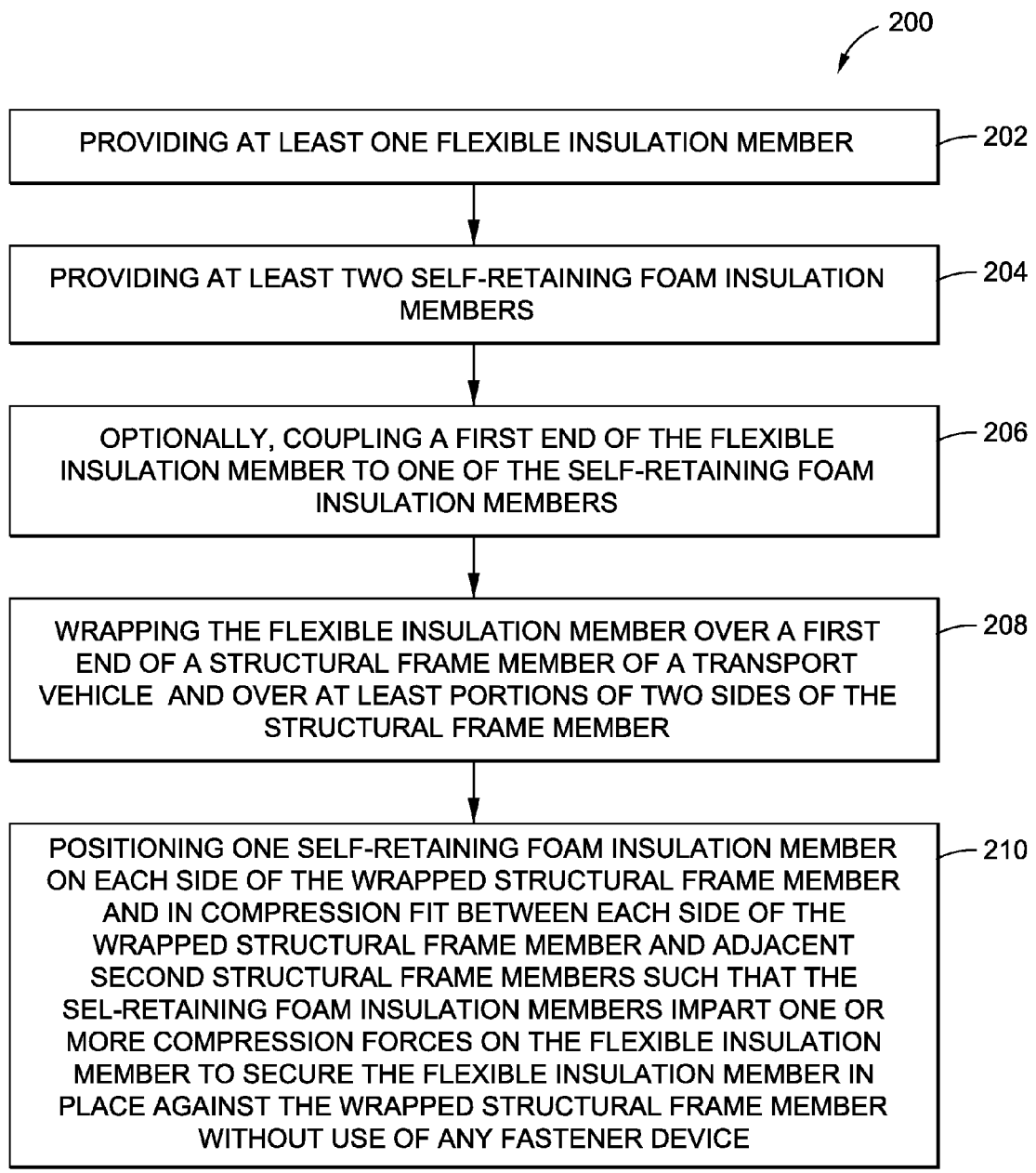
FIG. 9 is an illustration of a flow diagram of one of the exemplary embodiments of an insulation method of the disclosure; and, FIG. 10 is an illustration of a flow diagram of another one of the exemplary embodiments of an insulation method of the disclosure.

In another one of the embodiments of the disclosure, there is provided a method 200 of insulating a structural frame member 102 (see FIG. 7) of a transport vehicle 104 (see FIG. 8). FIG. 9 is an illustration of a flow diagram of one of the exemplary embodiments of the method 200 for insulating the structural frame member 102 (see FIG. 7) of the transport vehicle 104 (see FIG. 8). The transport vehicle 104 may comprise an aircraft 10 (see FIG. 1), an aerospace vehicle, a space launch vehicle, a rocket, a satellite, a rotorcraft, a watercraft, a boat, a train, an automobile, a truck, a bus, or another suitable transport vehicle. Preferably, the transport vehicle 104 is an aircraft 10 (see FIG. 1). Each structural frame member 102 is preferably coupled to a transport vehicle wall 106 (see FIGS. 7, 8) of the transport vehicle 104.

As shown in FIG. 9, the method 200 comprises step 202 of providing at least one flexible insulation member 118 (see FIGS. 7, 8). As discussed above, the flexible insulation member 118 may comprise an insulation blanket 119 (see FIG. 7). The flexible insulation member 118 may be comprised of fiberglass batting, fiberglass batting inside a plastic covering, an insulating fabric material, a flexible foam such as polyimide or melamine foam, or another suitable material. The method 200 further comprises step 204 of providing at least two self-retaining foam insulation members 130 (see FIGS. 7, 8), for example, first self-retaining foam insulation member 130a and second self-retaining foam insulation member 130b. As discussed above, each self-retaining foam insulation member 130 is preferably substantially rigid and self-retaining and may comprise an open cell foam (preferred for aircraft); a polymeric, cellular solid foam; a melamine foam; a closed cell foam; or another suitable self-retaining foam. Preferably, the self-retaining foam insulation member 130 has a density of from about 0.3 pounds per cubic foot to about 1.5 pounds per cubic foot. More preferably, the self-retaining foam insulation member 130 has a density of less than 0.4 pounds per cubic feet. Preferably, the self-retaining foam material is water resistant and lightweight.

The method 200 may further comprise optional step 206 of coupling the first end 120 of each flexible insulation member 118 to the second end 134 of self-retaining foam insulation member 130, for example, the second end 134 of first self-retaining form insulation member 130a. The first end 120 of each flexible insulation member 118 is preferably coupled to the second end 134 of each self-retaining foam insulation member 130 with an coupling element 142 (see FIG. 6). As discussed above, the coupling element 142 may comprise tape 144, such as an adhesive tape or a hook and loop tape; a glue or other type of adhesive; or another suitable coupling or attachment element. Alternatively, the first end 120 of the flexible insulation member 118 may be coupled to the second end 134 of the self-retaining foam insulation member 130 with coupling element in the form of a plastic bag (not shown) designed to fit snugly around the flexible insulation member 118 and the second self-retaining foam insulation member 130 in order to couple and retain them together.

The method 200 further comprises step 208 of wrapping the flexible insulation member 118 over a first free end 110a of a first structural frame member 102a (see FIGS. 7, 8) of the transport vehicle 104 and over at least portions 128 of two first and second sides 124, 126, respectively, of the first structural frame member 102a to obtain a wrapped first structural frame member.

The method 200 further comprises step 210 of positioning one self-retaining foam insulation member 130 on each side of the wrapped first structural frame member 102a and in compression fit between each side of the wrapped first structural frame member 102a and adjacent structural frame members 102. For example, the first end 132 of second self-retaining foam insulation member 130b (see FIG. 7) may be positioned on or adjacent wrapped second side 116a of first structural frame member 102a that is wrapped with the flexible insulation member 118, and the second end 134 of first self-retaining foam insulation member 130a (see FIG. 7) may be positioned on or adjacent wrapped first side 114a of first structural frame member 102a wrapped with the flexible insulation member 118. Preferably, the self-retaining foam insulation members 130, for example, the first self-retaining foam insulation member 130a and the second self-retaining foam insulation member 130b impart one or more compression forces ←F, F→ on the flexible insulation member 118 to secure the flexible insulation member 118 in place against the structural frame member 102, such as the first structural frame member 102a, without use of any fastener devices 36 (see FIG. 3), such as clip fasteners 38 (see FIGS. 4A-4B).

The second self-retaining foam insulation member 130b is preferably in compression fit between the first structural frame member 102a and an adjacent second structural frame member 102b and in contact with at least the flexible insulation member 118 wrapped around the first structural frame member 102a, such that the second self-retaining foam insulation member 130b imparts a compression force F→ (see FIG. 7) on and against the second end 122 of the flexible insulation member 118 wrapped around the first structural frame member 102a to compress the second end 122 of the flexible insulation member 118 on and against the first structural frame member 102a in order to secure the second end 122 of the flexible insulation member 118 in place against the first structural frame member 102a without use of any fastener devices 36 (see FIG. 3), such as clip fasteners 38 (see FIGS. 4A-4B). In addition, the second self-retaining foam insulation member 130b can impart a compression force ←F (see FIG. 7) on and against the flexible insulation member 118 wrapped around the second structural frame member 102b to compress the flexible insulation member 118 on and against the second structural frame member 102b in order to secure the flexible insulation member 118 in place against the second structural frame member 102b without use of any fastener devices 36 (see FIG. 3), such as clip fasteners 38 (see FIGS. 4A-4B).

The positioning step 210 of the method 200 may further comprise retaining or tucking the second end 122 of the flexible insulation member 118 wrapped around the first structural frame member 102a in between the first structural frame member 102a and the first end 132 of the second self-retaining foam insulation member 130b. The method 200 may insulate multiple structural frame members 102 in parallel along a length of one or more transport vehicle walls 106, where each structural frame member 102 is wrapped with the flexible insulation member 118 and each flexible insulation member 118 is secured in place by the self-retaining foam insulation members 130 disposed in compression between adjacent structural frame members 102. With multiple structural frame members 102, multiple flexible insulation members 118, and multiple self-retaining foam insulation members 130, the self-retaining foam insulation members 130 may impart compression forces F→, ←F (see FIG. 7) on and against the flexible insulation members 118 to compress the flexible insulation members 118 on and against the first and second structural frame members 102a, 102b, respectively, in order to secure the flexible insulation members 118 in place against the first and second structural frame members 102a, 102b, respectively.

The method 200 eliminates the use of fastener devices 36 (see FIG. 3) to secure the flexible insulation member 118 to the structural frame member 102 and thus reduces the overall manufacturing costs and weight of the transport vehicle 104 by not having to use any fastener devices 36 (see FIG. 3), such as clip fasteners 38 (see FIGS. 4A-4B).

Figure 10:
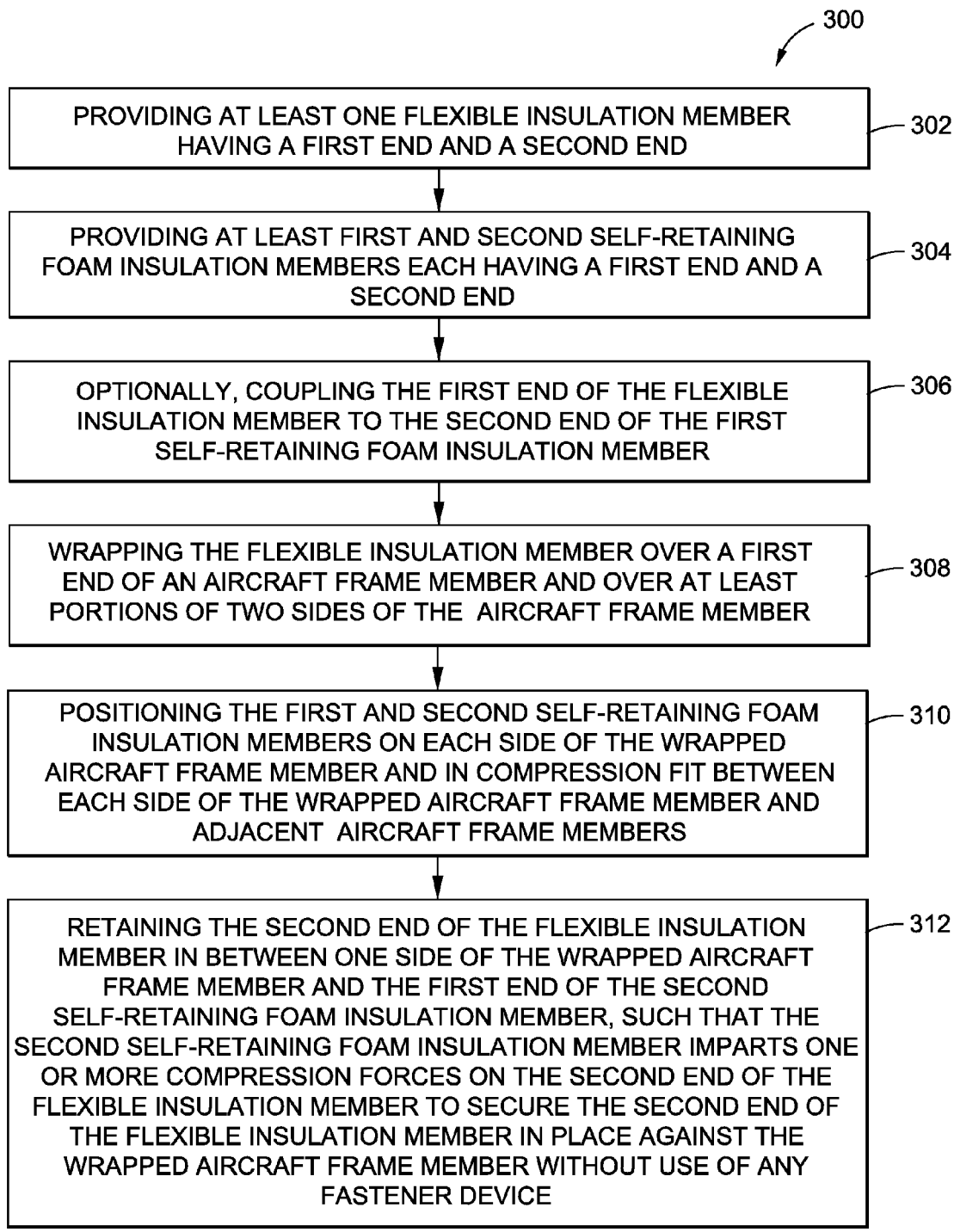

In another embodiment of the disclosure, there is provided a method 300 of insulating an aircraft frame member 152 of an aircraft 10 (see FIG. 1). FIG. 10 is an illustration of a flow diagram of an embodiment of the method 300 of insulating the aircraft frame member 152 of the disclosure. The method 300 comprises step 302 of providing at least one flexible insulation member 166 having a first end 168 and a second end 170 (see FIGS. 5A, 5B). The flexible insulation member 166 may comprise an insulation blanket 167 (see FIG. 5B) and may be made of fiberglass batting, fiberglass batting inside a plastic covering, an insulating fabric material, a flexible foam, such as polyimide or melamine foam, or another suitable material.

The method 300 further comprises step 304 of providing at least two self-retaining foam insulation members 180, for example, as least first and second self-retaining foam insulation members 180a, 180b each having a first end 182 and a second end 184 (see FIG. 5B). As discussed above, the self-retaining foam insulation member 180 is preferably substantially rigid and self-retaining and may comprise an open cell foam (preferred for aircraft); a polymeric, cellular solid foam; a melamine foam; a closed cell foam; or another suitable self-retaining foam. Preferably, the self-retaining foam insulation member 180 has a density of from about 0.3 pounds per cubic foot to about 1.5 pounds per cubic foot. More preferably, the self-retaining foam insulation member 180 has a density of less than 0.4 pounds per cubic feet. Preferably, the self-retaining foam material is water resistant and lightweight.

The method 300 may further comprise optional step 306 of coupling the first end 168 of the flexible insulation member 166 to the second end 184 of the first self-retaining foam insulation member 180a (see FIG. 5B). The first end 168 of the flexible insulation member 166 may be preferably coupled to the second end 184 of the first self-retaining foam insulation member 180a with a coupling element 190 (see FIG. 5B). As discussed above, the coupling element 190 may comprise tape 192, such as an adhesive tape or a hook and loop tape; a glue or other type of adhesive; or another suitable coupling or attachment element. Alternatively, the flexible insulation member 166 may be coupled to the second end 184 of the second self-retaining foam insulation member 180b with a coupling element in the form of a plastic bag (not shown) designed to fit snugly around the flexible insulation member 166 and the second self-retaining foam insulation member 180b in order to couple and retain them together.

The method 300 further comprises step 308 of wrapping the flexible insulation member 166 over a first free end 158 of a first aircraft frame member 152a and over at least portions 176 of two of the first and second sides 162, 164 of the first aircraft frame member 152a (see FIG. 5B). Preferably, each aircraft frame member 152 is coupled to an aircraft fuselage wall or skin 154 in an aircraft interior 156. The method 300 further comprises step 310 of positioning the second self-retaining foam insulation member 180b in compression between the first aircraft frame member 152a and an adjacent second aircraft frame member 152b (see FIG. 5A, 5B).

The method 300 further comprises step 310 of positioning the first and second self-retaining foam insulation members 180a, 180b on each side of the wrapped first aircraft frame member 152a and in compression fit between each side of the wrapped first aircraft frame member 152a and adjacent aircraft frame members 152. For example, the first end 182 of second self-retaining foam insulation member 180b (see FIG. 5A) may be positioned on or adjacent wrapped second side 164 of first aircraft frame member 152a that is wrapped with the flexible insulation member 166, and the second end 184 of the first self-retaining foam insulation member 180a (see FIG. 5A) may be positioned on or adjacent wrapped first side 162 of the first structural frame member 152a wrapped with the flexible insulation member 166. Preferably, the self-retaining foam insulation members 180, for example, the first self-retaining foam insulation member 180a and the second self-retaining foam insulation member 180b impart one or more compression forces ←F, F→ on the flexible insulation member 166 to secure the flexible insulation member 166 in place against the aircraft frame member 152, such as the first aircraft frame member 152a, without use of any fastener devices 36 (see FIG. 3), such as clip fasteners 38 (see FIGS. 4A-4B).

The method 300 further comprises step 312 of retaining or tucking the second end 170 of the flexible insulation member 166 wrapped around the first aircraft frame member 152a in between one side, such as second side 164 of the wrapped aircraft frame member 152a and the first end 182 of the second self-retaining foam insulation member 180b, such that the second self-retaining foam insulation member 180a imparts one or more compression forces ←F, F→ on the second end 170 of the flexible insulation member 166 to secure the second end 170 of the flexible insulation member 166 in place without use of any fastener devices 36 (see FIG. 3), such as clip fasteners 38 (see FIGS. 4A-4B).

The second self-retaining foam insulation member 180b imparts a compression force F→ (see FIG. 5A) on and against the second end 170 of the flexible insulation member 166 wrapped around the first aircraft frame member 152a to compress the second end 170 of the flexible insulation member 166 on and against the first aircraft frame member 152a in order to secure the second end 170 of the flexible insulation member 166 in place against the first aircraft frame member 152a without use of any fastener devices 36 (see FIG. 3), such as clip fasteners 38 (see FIGS. 4A-4B). In addition, the second self-retaining foam insulation member 180b imparts a compression force ←F (see FIG. 5A) on and against the flexible insulation member 166 wrapped around the second aircraft frame member 152b to compress the flexible insulation member 166 on and against the second aircraft frame member 152b in order to secure the flexible insulation member 166 in place against the second aircraft frame member 152b without use of any fastener devices 36 (see FIG. 3), such as clip fasteners 38 (see FIGS. 4A-4B).

The method 300 insulates multiple aircraft frame members 152 in parallel along a length of one or more aircraft fuselage walls or skins 154, where each aircraft frame member 152 is wrapped with the flexible insulation member 166, and each flexible insulation member 166 is secured in place by the self-retaining foam insulation members 180 disposed in compression between adjacent aircraft frame members 152. With multiple aircraft frame members 152, multiple flexible insulation members 166, and multiple self-retaining foam insulation members 180, the self-retaining foam insulation members 180 may impart compression forces F→, ←F (see FIG. 7) on the flexible insulation members 166 to compress the flexible insulation members 166 on and against the aircraft frame members 152 in order to secure the flexible insulation members 166 in place against the aircraft frame members 152.

The method 300 eliminates the use of fastener devices 36 (see FIG. 3) to secure the flexible insulation member 166 to the aircraft frame member 152 and reduces the overall manufacturing costs and weight of the aircraft 10 by not having to use any fastener devices 36 (see FIG. 3), such as clip fasteners 38 (see FIGS. 4A-4B).

Embodiments of the insulation systems 100, 150 and insulation methods 200, 300 provide thermal and acoustic insulation and protection to structural frame members of transport vehicles, such as an aircraft, aerospace vehicles, space launch vehicles, rockets, satellites, rotorcraft, watercraft, boats, trains, automobiles, trucks, buses, and other suitable transport vehicles. Embodiments of the insulation systems 100, 150 and insulation methods 200, 300 take advantage of the stiff nature of the self-retaining foam insulation members that can be compression-fit between the structural frame members of the transport vehicle structure, such as the aircraft frame members of the aircraft fuselage or body, to provide a means to insulate the structural frame members or aircraft frame members themselves with a flexible insulation member attached to the self-retaining foam insulation member. Using the sidewall pressure of the self-retaining foam insulation member between structural frame members of the transport vehicle structure, such as the aircraft frame members of the aircraft fuselage or body, holds the flexible insulation member in place.

Embodiments of the insulation systems 100, 150 and insulation methods 200, 300 reduce installation time and decrease costs of installation, labor and manufacturing. Further, embodiments of the insulation systems 100, 150 and insulation methods 200, 300 eliminate the use of known fastener devices to secure the flexible insulation members to the structural frame members of transport vehicles, and in particular, to the aircraft frame members of aircraft. Thus, no procurement, storage, organization, and inventory of such known fastener devices is required, which, in turn, can decrease costs of installation, labor and manufacturing. Moreover, eliminating the use of known fastener devices to secure the flexible insulation members to the structural frame members of transport vehicles, and in particular, to the aircraft frame members of aircraft can reduce the overall weight of the transport vehicle, such as the aircraft, which can, in turn, can decrease fuel costs. In addition, embodiments of the insulation systems 100, 150 and insulation methods 200, 300 are easy to use and install, provide water resistance, are durable, and are cost effective in terms of fabrication, installation and life cycle.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. An insulation system for use with transport vehicle structural frame members, the insulation system comprising:
   at least a first structural frame member and one or more adjacent structural frame members in a transport vehicle, each structural frame member having a first free end, a second end attached to a transport vehicle wall, and two sides disposed between the first free end and the second end;
   a flexible insulation member wrapped over both the first free end and the two sides of each structural frame member to obtain a wrapped structural frame member, the flexible insulation member not wrapped over the second end of each structural frame member; and,
   at least first and second self-retaining foam insulation members positioned adjacent to the wrapped first free end and the wrapped sides of each wrapped structural frame member and disposed in compression fit between each wrapped side of the wrapped structural frame member and each of the one or more adjacent structural frame members;
   wherein the first and second self-retaining foam insulation members impart one or more compression forces on the at least one flexible insulation member to secure the at least one flexible insulation member in place without use of any fastener device.

2. The system of claim 1, wherein the transport vehicle comprises an aircraft, an aerospace vehicle, a space launch vehicle, a rocket, a satellite, a rotorcraft, a watercraft, a boat, a train, an automobile, a truck, or a bus.

3. The system of claim 1, further comprising multiple structural frame members positioned in parallel along a length of one or more transport vehicle walls.

4. The system of claim 3, wherein each of the multiple structural frame members is wrapped with the at least one flexible insulation member, and each of the at least one flexible insulation members is secured in place by each of the at least first and second self-retaining foam insulation members disposed in compression fit between the one or more adjacent structural frame members.

5. The system of claim 1, wherein the at least first and second self-retaining foam insulation members comprise an open cell foam; a polymeric, cellular solid foam; a melamine foam; or a closed cell foam.

6. An aircraft frame member insulation system in an aircraft, the system comprising:
   at least a first aircraft frame member and one or more adjacent aircraft frame members positioned in an aircraft interior, each of the aircraft frame members having a first free end, a second end attached to an aircraft fuselage wall, and two sides disposed between the first free end and the second end;
   a flexible insulation member wrapped over both the first free end and the two sides of each aircraft frame member to obtain a wrapped aircraft frame member, the flexible insulation member not wrapped over the second end of each structural frame member; and,
   at least first and second self-retaining foam insulation members positioned adjacent to the wrapped first free end and the wrapped sides of each wrapped aircraft frame member and disposed in compression fit between each wrapped side of the wrapped aircraft frame member and each of the one or more adjacent aircraft frame members;
   wherein the first and second self-retaining foam insulation members impart one or more compression forces on the at least one flexible insulation member to secure the at least one flexible insulation member in place without use of any fastener device.

7. The system of claim 6, further comprising multiple aircraft frame members positioned in parallel along a length of one or more aircraft fuselage walls.

8. The system of claim 7, wherein each of the multiple aircraft frame members is wrapped with the at least one flexible insulation member, and each of the at least one flexible insulation members is secured in place by each of the at least first and second self-retaining foam insulation members disposed in compression fit between the one or more adjacent aircraft frame members.

9. The system of claim 6, wherein the at least first and second self-retaining foam insulation members comprise an open cell foam; a polymeric, cellular solid foam; a melamine foam; or a closed cell foam.

10. The system of claim 6, further comprising an insulation assembly comprising the at least one flexible insulation member, one of the self-retaining foam insulation members, and a coupling element configured to couple the at least one flexible insulation member to the self-retaining form insulation member.

11. The system of claim 10, wherein the coupling element comprises an adhesive tape, a hook and loop tape, a glue, or a plastic bag configured to fit snugly around the at least one flexible insulation member and the self-retaining foam insulation member.

12. The system of claim 6, wherein each of the at least first and second self-retaining foam insulation members has a density of from about 0.3 pounds per cubic foot to about 1.5 pounds per cubic foot.

13. The system of claim 6, wherein the at least one flexible insulation member comprises an insulation blanket, fiberglass batting, fiberglass batting inside a plastic covering, an insulating fabric material, a flexible polyimide foam, or a flexible melamine foam.

* * * * *